United States Patent
Wang

(10) Patent No.: US 10,277,881 B2
(45) Date of Patent: Apr. 30, 2019

(54) METHODS AND DEVICES FOR DETERMINING VISUAL FATIGUE OF THREE-DIMENSIONAL IMAGE OR VIDEO AND COMPUTER READABLE STORAGE MEDIUM

(71) Applicant: BOE TECHNOLOGY GROUP CO., LTD., Beijing (CN)

(72) Inventor: Tieshi Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 83 days.

(21) Appl. No.: 15/706,230

(22) Filed: Sep. 15, 2017

(65) Prior Publication Data

US 2018/0227563 A1   Aug. 9, 2018

(30) Foreign Application Priority Data

Feb. 6, 2017   (CN) .......................... 2017 1 0066363

(51) Int. Cl.
| | | |
|---|---|---|
| G06T 7/593 | (2017.01) | |
| H04N 13/144 | (2018.01) | |
| H04N 13/106 | (2018.01) | |
| H04N 13/00 | (2018.01) | |

(52) U.S. Cl.
CPC .......... *H04N 13/144* (2018.05); *G06T 7/593* (2017.01); *H04N 13/106* (2018.05); *G06T 2207/10021* (2013.01); *H04N 2013/0081* (2013.01); *H04N 2213/002* (2013.01)

(58) Field of Classification Search
None
See application file for complete search history.

(56) References Cited

U.S. PATENT DOCUMENTS

| 2011/0142309 A1 | 6/2011 | Zhang et al. |
| 2012/0098823 A1 | 4/2012 | Hong et al. |
| 2015/0071525 A1 | 3/2015 | Routhier et al. |

FOREIGN PATENT DOCUMENTS

| CN | 102027752 A | 4/2011 |
| CN | 102750695 A | 10/2012 |
| CN | 103281959 A | 9/2013 |
| CN | 103458259 A | 12/2013 |
| CN | 103780894 A | 5/2014 |
| CN | 104067612 A | 9/2014 |
| CN | 104754322 A | 7/2015 |
| CN | 104969547 A | 10/2015 |
| CN | 105959679 A | 9/2016 |

OTHER PUBLICATIONS

First Chinese Office Action, for Chinese Patent Application No. 201710066363.9, dated Feb. 1, 2018, 18 pages.
Second Chinese Office Action, for Chinese Patent Application No. 201710066363.9, dated Sep. 3, 2018, 21 pages.

*Primary Examiner* — Mark Roz
(74) *Attorney, Agent, or Firm* — Kinney & Lange, P.A.

(57) ABSTRACT

The embodiments of the present disclosure propose a method and device for determining a visual fatigue of a three dimensional (3D) image or a 3D video and a computer readable storage medium. The method comprises: determining depth-of-field values of at least a part of pixels of the 3D image or at least one frame of 3D image in the 3D video; and determining the visual fatigue of the 3D image or the 3D video according to the depth-of-field values.

18 Claims, 5 Drawing Sheets

METHODS AND DEVICES FOR DETERMINING VISUAL FATIGUE OF THREE-DIMENSIONAL IMAGE OR VIDEO AND COMPUTER READABLE STORAGE MEDIUM

CROSS-REFERENCE TO RELATED APPLICATION(S)

The present application claims priority to the Chinese Patent Application No. 201710066363.9, filed on Feb. 6, 2017, entitled "METHODS AND DEVICES FOR DETERMINING VISUAL FATIGUE OF THREE-DIMENSIONAL IMAGE OR VIDEO," which is incorporated herein by reference in its entirety.

TECHNICAL FIELD

The present disclosure generally relates to the field of display, and more particularly, to a method and device for determining visual fatigue for a three-dimensional (3D) image or video and a computer readable storage medium.

BACKGROUND

With the progress of technology, movie theaters are no longer the only places to watch 3D movies. In fact, it is also possible to watch a 3D video using a television (in cooperation with stereo glasses) at home, or watch a 3D video with a mobile phone (for example, in cooperation with a Head-Mounted Device (HMD)).

However, a common phenomenon is that whenever a 3D video is watched for a period of time, people may usually feel discomfort symptoms such as dizziness, vomiting, dry eyes etc., which is slightly similar to the symptoms of carsickness, and is a kind of motion sickness. More specifically, it involves a motion sickness for which a motion is observed by eyes but is not felt by the body, which is sometimes also referred to as visual fatigue.

SUMMARY

However, there is currently no objective solution of determining a visual fatigue for a 3D image or 3D video. To this end, a method and device for determining a visual fatigue of a 3D image or video and a computer-readable storage medium according to an embodiment of the present disclosure are proposed.

According to a first aspect of the present disclosure, there is proposed a method for determining a visual fatigue of a 3D image or a 3D video. The method comprises: determining depth-of-field values of at least a part of pixels of the 3D image or at least one frame of 3D image in the 3D video; and determining the visual fatigue of the 3D image or the 3D video according to the depth-of-field values.

In some embodiments, the step of determining depth-of-field values of at least a part of pixels of the 3D image or at least one frame of 3D image in the 3D video comprises: determining a parallax of each of the at least a part of the pixels; and determining a depth-of-field value of a corresponding pixel according to the parallax. In some embodiments, the step of determining the visual fatigue of the 3D image or the 3D video according to the depth-of-field values comprises: determining spatial depth-of-field differences between spatial adjacent pixels in the at least a part of the pixels according to the depth-of-field values; determining a spatial visual fatigue of the 3D image or the 3D video according to the spatial depth-of-field differences; and determining the visual fatigue at least partly according to the spatial visual fatigue. In some embodiments, the spatial adjacent pixels comprise one or more adjacent or spaced adjacent pixels in a spatial direction. In some embodiments, the step of determining a spatial visual fatigue of the 3D image or the 3D video according to the spatial depth-of-field differences comprises: determining a standard deviation of all the spatial depth-of-field differences as the spatial visual fatigue of the 3D image or the 3D video. In some embodiments, the step of determining the visual fatigue of the 3D video according to the depth-of-field values comprises: calculating temporal depth-of-field differences between corresponding pixels in two frames of 3D image in the 3D video; determining a temporal visual fatigue of the 3D video according to the temporal depth-of-field differences; and determining the visual fatigue at least partly according to the temporal visual fatigue. In some embodiments, the two frames of 3D image are two frames of 3D image which are adjacent or spaced adjacent to each other in a forward time direction and/or in a backward time direction. In some embodiments, the step of determining a temporal visual fatigue of the 3D video according to the temporal depth-of-field differences comprises: determining a standard deviation of all the temporal depth-of-field differences as the temporal visual fatigue of the 3D video. In some embodiments, the step of determining the visual fatigue of the 3D image or the 3D video according to the depth-of-field values comprises: calculating a standard error between the depth-of-field values of the at least a part of the pixels and predetermined depth-of-field values as a standard visual fatigue for the at least a part of the pixels; and determining the visual fatigue at least partly according to the standard visual fatigue. In some embodiments, the step of determining the visual fatigue of the 3D image or the 3D video according to the depth-of-field values comprises: determining the visual fatigue according to any two or more of a spatial visual fatigue, a temporal visual fatigue, and a standard visual fatigue. In some embodiments, before the step of determining depth-of-field values of at least a part of pixels of the 3D image or at least one frame of 3D image in the 3D video, the method further comprises dividing the 3D image or at least one frame of 3D image in the 3D video into multiple partitions, wherein the step of determining depth-of-field values of at least a part of pixels of the 3D image or at least one frame of 3D image in the 3D video and the step of determining the visual fatigue of the 3D image or the 3D video according to the depth-of-field values are performed for at least one of the multiple partitions, to determine visual fatigues of corresponding partitions respectively; and determining the visual fatigue of the 3D image or at least one frame of 3D image in the 3D video according to the visual fatigues of the at least one partition. In some embodiments, wherein the step of determining the visual fatigue of the 3D image or at least one frame of 3D image in the 3D video according to the visual fatigues of the at least one partition comprises: determining a weight of a corresponding partition according to a size and/or location of each of the at least one partition; and determining the visual fatigue of the 3D image or at least one frame of 3D image in the 3D video according to visual fatigues of various partitions and corresponding weights of the partitions.

According to a second aspect of the present disclosure, there is proposed a device for determining a visual fatigue of a 3D image or a 3D video. The method comprises: a depth-of-field value determination unit configured to determine depth-of-field values of at least a part of pixels of the 3D image or at least one frame of 3D image in the 3D video; and a visual fatigue determination unit configured to determine the visual fatigue of the 3D image or the 3D video according to the depth-of-field values.

According to a third aspect of the present disclosure, there is proposed a device for determining a visual fatigue of a 3D image or a 3D video. The method comprises: a processor, a memory having instructions stored thereon, which, when executed by the processor, cause the processor to: determine depth-of-field values of at least a part of pixels of the 3D image or at least one frame of 3D image in the 3D video; and determine the visual fatigue of the 3D image or the 3D video according to the depth-of-field values.

In some embodiments, the instructions, when executed by the processor, further cause the processor to: determine a parallax of each of the at least a part of the pixels; and determine a depth-of-field value of a corresponding pixel according to the parallax. In some embodiments, the instructions, when executed by the processor, further cause the processor to: determine spatial depth-of-field differences between spatial adjacent pixels in the at least a part of the pixels according to the depth-of-field values; determine a spatial visual fatigue of the 3D image or the 3D video according to the spatial depth-of-field differences; and determine the visual fatigue at least partly according to the spatial visual fatigue. In some embodiments, the instructions, when executed by the processor, further cause the processor to: calculate temporal depth-of-field differences between corresponding pixels in two frames of 3D image in the 3D video; determine a temporal visual fatigue of the 3D video according to the temporal depth-of-field differences; and determine the visual fatigue at least partly according to the temporal visual fatigue. In some embodiments, the instructions, when executed by the processor, further cause the processor to: calculate a standard error between the depth-of-field values of the at least a part of the pixels and predetermined depth-of-field values as a standard visual fatigue for the at least a part of the pixels; and determine the visual fatigue at least partly according to the standard visual fatigue. In some embodiments, the instructions, when executed by the processor, further cause the processor to: determine the visual fatigue according to any two or more of a spatial visual fatigue, a temporal visual fatigue, and a standard visual fatigue. In some embodiments, the instructions, when executed by the processor, further cause the processor to: determine depth-of-field values of at least a part of pixels for at least one of the multiple partitions, and determine visual fatigues of corresponding partitions according to the depth-of-field values; and determine the visual fatigue of the 3D image or at least one frame of 3D image in the 3D video according to the visual fatigues of the at least one partition.

Further, according to fourth aspect of the present disclosure, there is proposed a non-transitory computer readable storage medium for storing a computer program, which, when executed by a processor, causes the processor to perform the method according to the first aspect.

BRIEF DESCRIPTION OF THE DRAWINGS

The foregoing and other purposes, features and advantages of the present disclosure will become more apparent from the following description of some embodiments of the present disclosure when taken in conjunction with the accompanying drawings in which.

DETAILED DESCRIPTION

Figure 1:
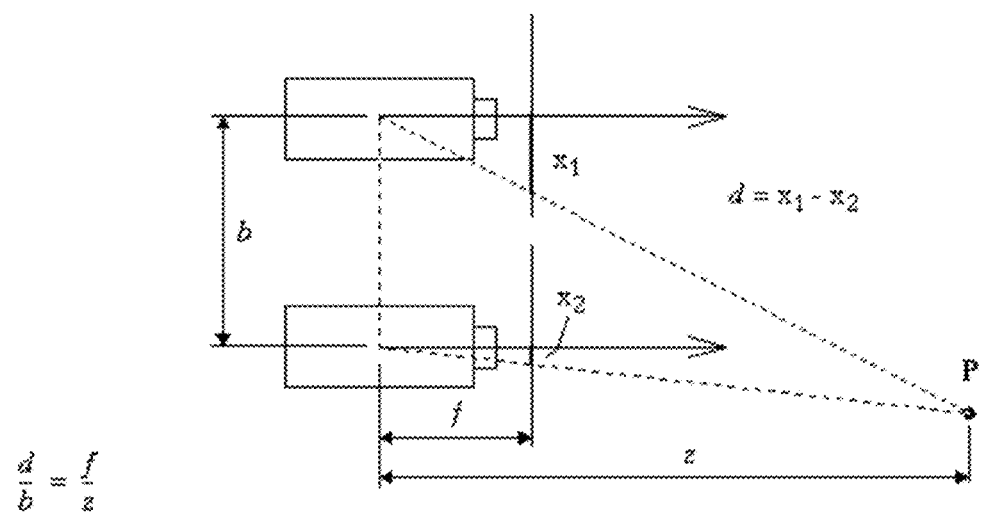
FIG. 1 is an exemplary diagram illustrating how to calculate a depth-of-field value according to a parallax according to an embodiment of the present disclosure.

Some embodiments of the present disclosure will be described in detail below with reference to the accompanying drawings, in which details and functions which are not necessary for the present disclosure are omitted in the description in order to prevent confusion in the understanding of the present disclosure. In the present specification, the following description of various embodiments for describing the principles of the present disclosure is illustrative only and should not be construed as limiting the scope of the disclosure in any way. The following description of the drawings, with reference to the accompanying drawings, is provided to assist in a comprehensive understanding of the example embodiments of the disclosure as defined by the claims and their equivalents. The following description includes many specific details to assist in the understanding, but such details are to be regarded as merely exemplary. Accordingly, those of ordinary skill in the art will recognize that numerous changes and modifications can be made to the embodiments described herein without departing from the scope and spirit of the present disclosure. In addition, descriptions of well-known functions and structures are omitted for clarity and conciseness. In addition, the same reference numerals are used for the same or similar functions and operations throughout the accompanying drawings.

Hereinafter, the present disclosure is described in detail, by taking a scene in which the present disclosure is applied to an electronic device as an example. However, the present disclosure is not limited thereto, and the present disclosure may also be applied to any suitable device. With respect to the electronic device, the present disclosure is not limited to a specific operating system of the electronic device, and may include, but is not limited to, iOS, Windows Phone, Symbian, Android, Windows, Linux, etc. Different electronic devices may use the same operating system, or may use different operating systems.

In the present disclosure, the terms "comprising" and "including" and their derivatives are intended to be inclusive instead of being limiting, and the term "or" is inclusive, which means "and/or". In the following, some of the terms to be used in the present disclosure will be explained firstly.

Stereoscopic images or three-dimensional (3D) images: in general, current common stereoscopic (3D) images are typically implemented by generating two different planar images for left and right eyes which are substantially the same but have slight differences (i.e., "parallax" hereinafter) so as to enable a human brain to have stereoscopic feeling. Therefore, a 3D image typically comprises a left eye image for the left eye and a right eye image for the right eye.

3D video: a series of temporally consecutive 3D images.

Parallax: A positional deviation of the same object between the left eye image and the right eye image in the 3D image.

Depth of field or depth: a vertical distance between a 3D object (or one of pixels in the 3D object) observed by a user in the 3D image or 3D video and a straight line between the user's eyes. In general, the depth of field here is slightly different from definition of a depth of field in the field of photography. The depth of field here is not a clear imaging range as in the field of photography, but is a specific value. In the field of 3D computing, this value is generally referred to as a Z value. In addition, it should be noted that one of pixels in the 3D image or 3D video mentioned here may refer to corresponding pixels in the left eye image and the right eye image, i.e., a left eye pixel and a right eye pixel, and thus a depth of field of a certain pixel in the 3D image/video actually refers to a depth of field of a 3D pixel formed by the corresponding pixels in the left eye image and the right eye image, which may be determined by, for example, the method described below, according to a parallax.

In general, it may generally be considered that a fatigue of human eyes caused by the 3D image or video mainly results from a change in a parallax in the 3D image or video. When 3D objects are observed by the human eyes, they eyes needs to adjust the curvature of their crystalline lens through the ciliaris, so as to clearly image different distant and near 3D objects. Therefore, when a highly frequent change in the depth of fields occurs in the 3D image or video to be observed, it is necessary for the human eyes to frequently adjust the crystalline lens for clear imaging, which results in an increased fatigue of the eyes, and then leads to a corresponding fatigue of the brain. According to this discovery, an objective method for assessing and/or determining a visual fatigue of a 3D image or video according to an embodiment of the present disclosure is proposed. It is to be noted, however, that the present disclosure is not limited thereto but may also be applied to other similar fields or applicable fields.

In some embodiments of the present disclosure, a method and a device for determining a visual fatigue of a 3D image or video and a computer-readable storage medium are generally proposed, which may be summarized as follows. Firstly, a depth-of-field value of each pixel in the 3D image is determined. Then, one or more of a temporal visual fatigue, a spatial visual fatigue, and a standard visual fatigue of the 3D image are determined according to depth-of-field values of one or more pixels, and a comprehensive visual fatigue is finally determined based thereon.

Firstly, how to determine the depth-of-field value of each pixel in the 3D image or video will be described in detail in conjunction with FIG. 1. FIG. 1 is an exemplary diagram illustrating how to calculate a depth-of-field value according to a parallax according to an embodiment of the present disclosure.

As shown in FIG. 1, a 3D image is usually obtained by photographing the same object (for example, an object P in FIG. 1) through two cameras respectively to obtain a left eye image and a right eye image respectively. Without loss of generality, it may be assumed that axes of the two cameras are parallel and focal lengths of the two cameras are known to be f and a distance between the two cameras (a distance between two parallel axes of the cameras) is known to be b.

In this case, if a parallax is d (as shown in FIG. 1, $d=x_1-x_2$), the following formula may be obtained according to similar triangles, to give a depth of field z of the object P:

$$z = \frac{bf}{d}$$

However, this is only a simplified formula for the situation shown in FIG. 1. In a case that there are multiple cameras (multiple views), different focal lengths of the cameras, and/or non-parallel axes of the cameras, for example, a more complex formula may be used to obtain the depth of field z according to the parallax d. In addition, in some embodiments, data of the 3D image or video per se may also carry metadata related to the depth of field for each pixel. However, a specific manner of deriving the depth-of-field value according to the parallax does not affect a manner of determining a visual fatigue of the 3D image, and therefore will not be described in detail herein.

Next, a method for determining a visual fatigue of a 3D image or 3D video will be described in detail with reference to FIGS. 2 to 5.

Figure 2:
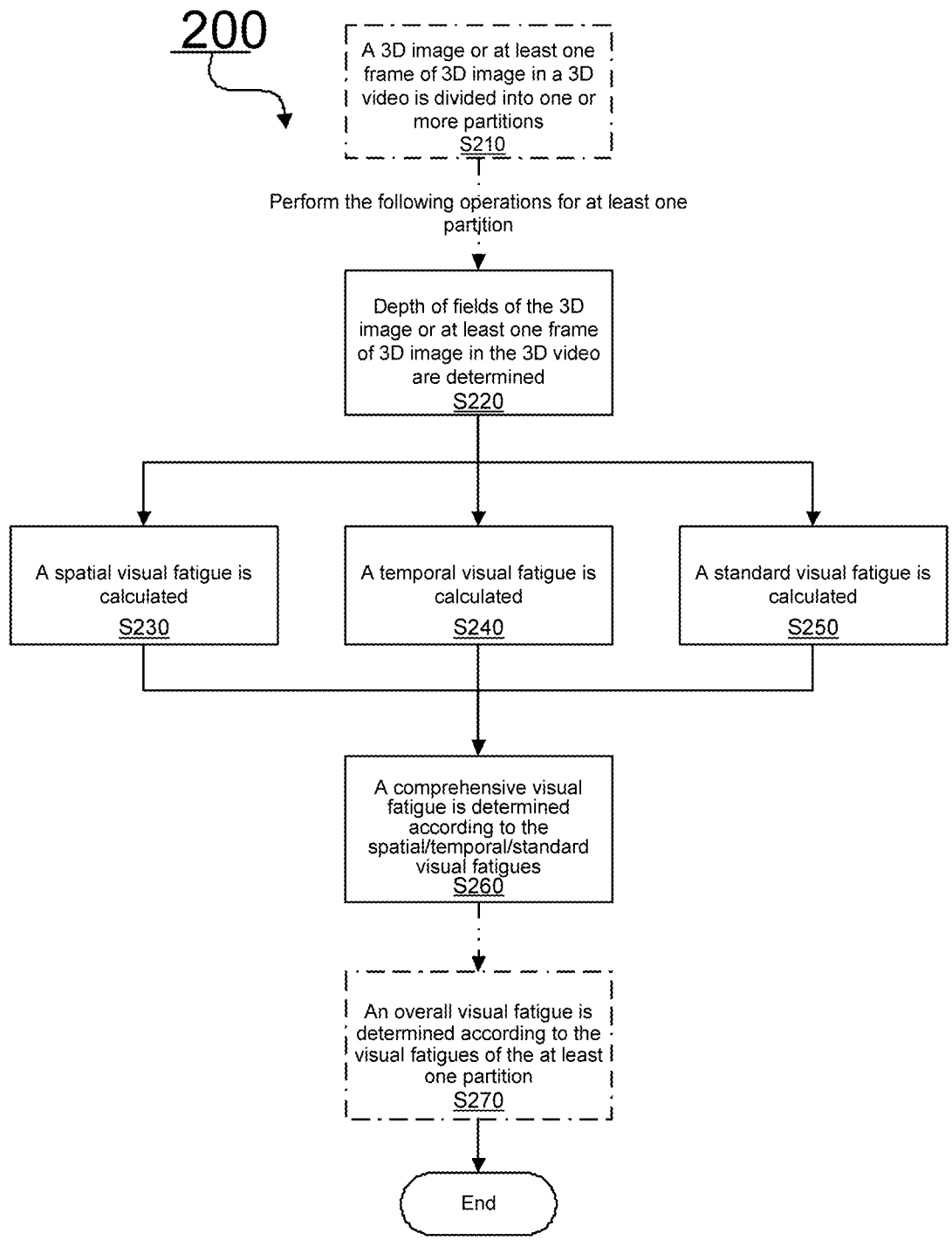
FIG. 2 is a flowchart of an exemplary method for determining a visual fatigue of a 3D image or 3D video according to an embodiment of the present disclosure.
Figure 3:
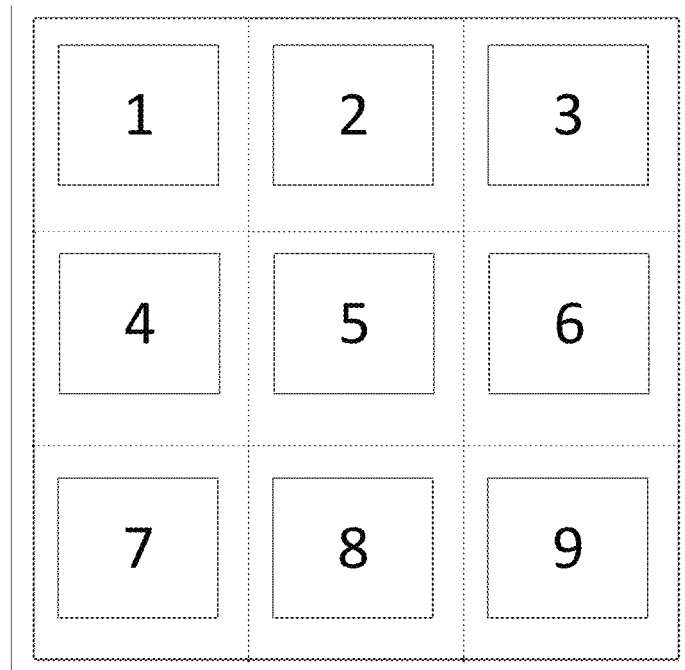
FIG. 3 is a diagram illustrating an exemplary partitioning scheme according to an embodiment of the present disclosure.

FIG. 2 is a flowchart illustrating an exemplary method 200 for determining a visual fatigue of a 3D image or 3D video according to an embodiment of the present disclosure. As shown in FIG. 2, in an optional step S210, the 3D image or at least one frame of 3D image in the 3D video may be divided into one or more partitions. For example, in an example shown in FIG. 3, the 3D image is divided into 9 partitions, which are numbered as partitions 1 to 9 sequentially from the upper left to the lower right. It should be noted, however, that the embodiments of the present disclosure are not limited thereto and the 3D image or at least one frame of 3D image in the 3D video may actually also be divided into more or fewer partitions, and shapes of the partitions are not necessarily square. For example, the 3D image may be divided into 2 partitions, 3 partitions . . . and so on. In addition, the partitions may also be set to a rectangle, a circle, a triangle, or any other shape. In addition, for example, the partition 5 of FIG. 3 in the 3D image may also be separately treated as one area and other partitions are treated as the other area, so as to highlight an object at the center of a picture.

The purpose of the partitioning is to assign various partitions different weight values and obtain a comprehensive visual fatigue according to these weight values and the visual fatigue calculated for each partition. The reason is that when a 3D picture is observed by human eyes, it is generally impossible to observe all the objects in the picture at the same time, and crystalline lens of the human eyes are usually adjusted only for an object to be observed. Therefore, the visual fatigue of the 3D image or video can be more accurately determined by assigning a higher weight value to a partition where the object to be observed is located while adjusting weights of other partitions. For example, in most of 3D movies, an object to which attention is needed to be paid by audiences is generally in the partition 5, objects in the partitions 2, 4, 6 and 8 are relatively less important, and objects in the partitions 1, 3, 7 and 9 are basically not important. Therefore, weights may be assigned accordingly. For example, a higher weight is assigned to the partition 5, moderate weights are assigned to the partitions 2, 4, 6, and 8, and lower weights are assigned to the partitions 1, 3, 7 and 9. However, the present disclosure is not limited thereto, and weights which are the same or partly the same may be assigned to various partitions as needed.

It should be noted, however, that this step S210 is not necessary and, in fact, the 3D image or video may not be partitioned.

Next, subsequent operations may be performed for at least one of the various partitions. For partitions for which the subsequent operations are not performed, visual fatigues thereof may be considered as null and the visual fatigues thereof may be ignored or a default visual fatigue may be used.

In step S220, depth-of-field values of the 3D image or at least one frame of 3D image in the 3D video may be determined. For example, depth-of-field values of all or a part of the pixels in the 3D image or 3D video (or each partition) may be determined using the scheme shown in FIG. 1 or in other manners. In addition, the step S220 may be performed before step S210 or in parallel with step S210, and is not necessarily performed after the partitioning of S210.

Next, calculations related to various visual fatigues will be performed, wherein the various visual fatigues comprise, but are not limited to, a spatial visual fatigue (S230), a temporal visual fatigue (S240), and/or a standard visual fatigue (S250). In step S260, determination may be made according to any one, two, or all of the three visual fatigues. In addition, the three steps may be performed in parallel, sequentially, out of order, or in any other manner, which will be described in detail below one by one.

Figure 4:
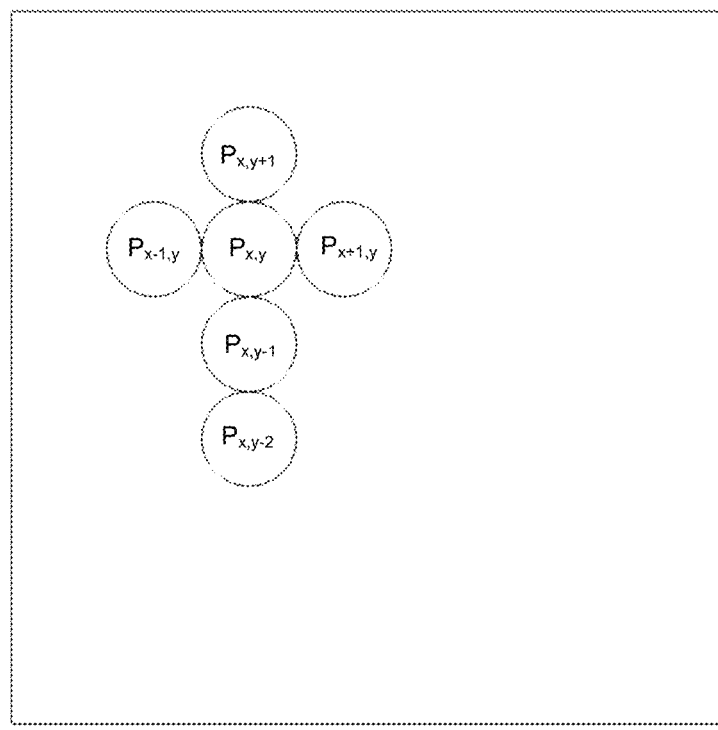
FIG. 4 is a diagram illustrating exemplary pixels used for calculating a spatial visual fatigue according to an embodiment of the present disclosure.

How to calculate the spatial visual fatigue of the 3D image/video in step S230 will be described in detail with reference to FIG. 4. FIG. 4 is a diagram illustrating exemplary pixels used for calculating the spatial visual fatigue according to an embodiment of the present disclosure.

Specifically, FIG. 4 illustrates a part of pixels in a 3D image which are centered at $P_{x,y}$. When a spatial visual fatigue of a pixel $P_{x,y}$ is calculated, a pixel $P_{x+1,y}$ adjacent to $P_{x,y}$ may be acquired and a difference $P_{x,y}-P_{x+1,y}$ between depth-of-field values of the two pixels is calculated. In some other embodiments, a pixel (for example, $P_{x-1,y}$, $P_{x,y+1}$, or $P_{x,y-1}$ etc.) adjacent to $P_{x,y}$ in a different direction may also be acquired and a difference, for example, $P_{x,y}-P_{x-1,y}$, between depth-of-field values of the two pixels may be calculated. In addition, a pixel, for example, one of $P_{x,y-2}$, $P_{x,y+2}$, $P_{x-2,y}$ and $P_{x+2,y}$, which is spaced adjacent to $P_{x,y}$ in various directions may also be acquired and a difference, for example, $P_{x,y}-P_{x-2,y}$ etc., between depth-of-field values of the two pixels may be calculated. In addition, a plurality of pixels, for example, $P_{x,y-2}$ and $P_{x,y-1}$, in a range which are adjacent to $P_{x,y}$ may also be acquired and an average value $$\frac{(P_{x,y} - P_{x,y-2}) + (P_{x,y} - P_{x,y-1})}{2}$$

of differences between depth-of-field values of the two pixels and the depth-of-field value of $P_{x,y}$ is calculated. In addition, a plurality of pixels, for example, $P_{x,y-1}$, $P_{x,y+1}$, $P_{x-1,y}$, $P_{x+1,y}$, $P_{x+1,y-1}$, $P_{x+1,y+1}$, $P_{x-1,y-1}$ and $P_{x-1,y+1}$, in a range which are adjacent to $P_{x,y}$ in different directions may also be acquired and an average value $$\frac{(P_{x,y} - P_{x,y-1}) + \ldots + (P_{x,y} - P_{x-1,y+1})}{8}$$

of differences between depth-of-field values of the eight pixels and the depth-of-field value of $P_{x,y}$ is calculated. More generally, a certain set of pixels including $P_{x,y}$ in the same frame may be acquired and an average value (which may be referred herein to as a spatial depth-of-field difference of the pixel $P_{x,y}$) of differences between depth-of-field values of pixels in the set other than $P_{x,y}$ and the depth-of-field of $P_{x,y}$ may be calculated. For ease of the description, a difference between the depth-of-field values of the pixels $P_{x,y}$ and $P_{x+1,y}$ is calculated as the spatial depth-of-field difference by taking calculations of the pixels $P_{x,y}$ and $P_{x+1,y}$ as an example. In addition, although the average value is used above, the average value may not be calculated actually, and the depth-of-field differences of these pixels may be compared and/or calculated as described below as long as the same calculation method is used for each pixel.

After calculating the spatial depth-of-field differences of various pixels, a standard deviation (or a mean square error) of the spatial depth-of-field differences in the 3D image/video/partition may be calculated as follows:

$$S_1 = \sqrt{\frac{\sum_{i=1}^{n}(P_i - P_{ave1})^2}{n}}$$

as the spatial visual fatigue of the 3D image/video/partition, where $P_i$ is a spatial depth-of-field difference calculated for an $i^{th}$ pixel, $P_{ave1}$ is P an average value of the spatial depth-of-field differences, n is a number of pixels in the 3D image/video/partition, and $S_1$ is the spatial visual fatigue.

The purpose of the spatial visual fatigue is to present a visual fatigue caused by different depth of fields of adjacent pixels observed by an observer in the same picture. For example, visual fatigue is likely to occur when the observer's point of view is switched back and forth between a distant object and a nearby object. Thus, the spatial visual fatigue reflects this feature in the 3D image or video. In general, the less the fatigue, the less the likeliness for the audience to fatigue during observation.

Figure 5:
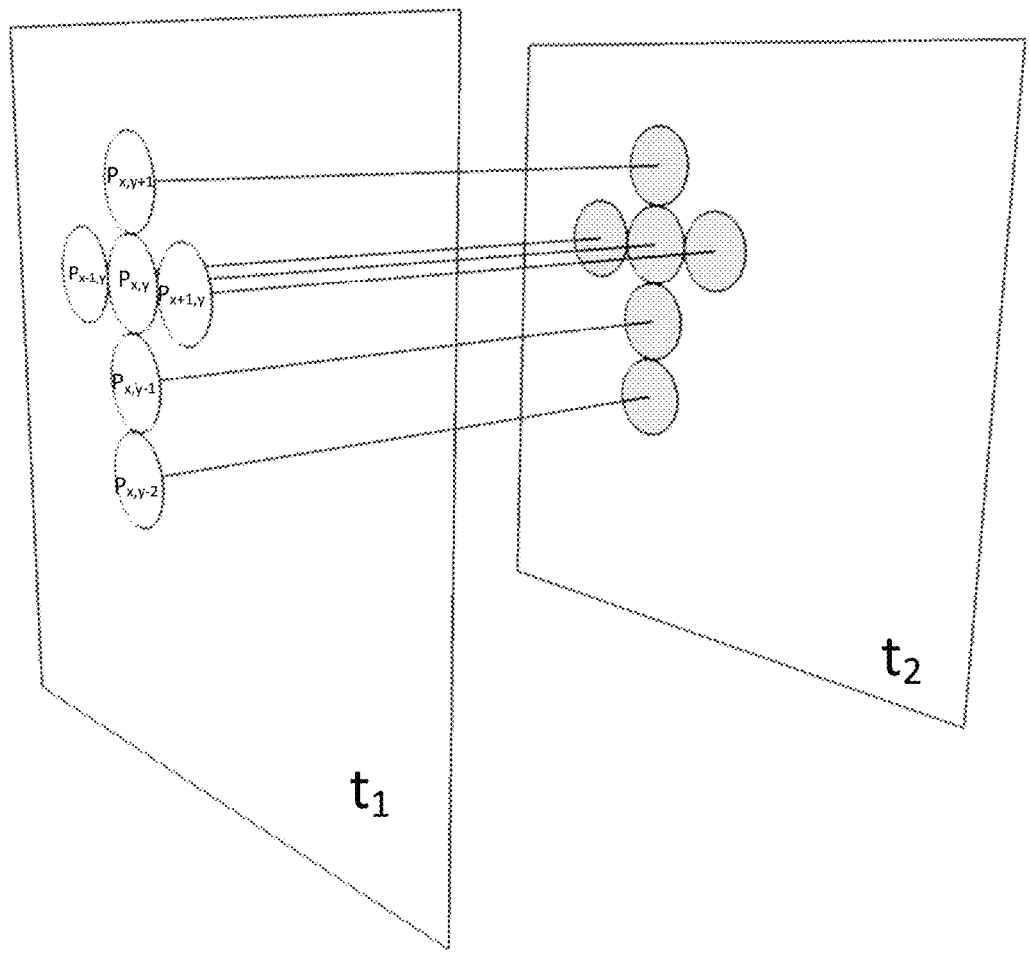
FIG. 5 is a diagram illustrating exemplary pixels used for calculating a temporal visual fatigue according to an embodiment of the present disclosure.

Next, how to calculate a temporal visual fatigue of the 3D video in step S240 will be described in detail with reference to FIG. 5. FIG. 5 is a diagram illustrating exemplary pixels used for calculating the temporary visual fatigue according to an embodiment of the present disclosure.

FIG. 5 illustrates two frames of 3D image in the 3D video, which are 3D images at times $t_1$ and $t_2$, respectively, in which each frame of 3D image is similar to the 3D image shown in FIG. 4. In an embodiment, the 3D images at the times $t_1$ and $t_2$ may be two frames of 3D image which are temporarily consecutive. In another embodiment, the 3D images at the times $t_1$ and $t_2$ may be two frames of 3D image which are temporarily spaced adjacent, for example, may be spaced by one or more frames. In addition, in the embodiment shown in FIG. 5, the time $t_1$ may be less than the time $t_2$, that is, a user may firstly observe a $t_1$ frame and then a $t_2$ frame. Of course, the time $t_1$ may also be greater than the time $t_2$, that is, the user may firstly observe the $t_2$ frame, and then the $t_1$ frame.

When the temporal visual fatigue of, for example, the pixel $P_{x,y}$ at the $t_1$ frame is calculated, a pixel $P_{x,y}$ at the $t_2$ frame which is adjacent to $P_{x,y}$ at the $t_1$ frame may be acquired and a difference between depth-of-field values of the two pixels may be calculated. In some other embodiments, a pixel (for example, $P_{x,y}$ of a $t_0$ frame etc.) which is adjacent to $P_{x,y}$ at the $t_1$ frame in a different time direction (forward/backward direction) may also be acquired and a difference between depth-of-field values of the two pixels may be calculated. In addition, pixels which are temporarily adjacent to $P_{x,y}$ at the $t_1$ frame in both of the two directions may be acquired. More generally, a set of pixels at different frames including $P_{x,y}$ at the $t_1$ frame may be acquired and an average value (which may be referred herein to as a temporary depth-of-field difference of the pixel $P_{x,y}$) of differences between depth-of-field values of the pixels in the set other than $P_{x,y}$ and the depth-of-field value of $P_{x,y}$ may be calculated. For example, the set may comprise, but is not limited to, $P_{x,y}$ at the $t_0$ frame, $P_{x,y}$ at the $t_2$ frame, $P_{x,y}$ at the $t_3$ frame, $P_{x-1,y}$ at the $t_2$ frame, and/or $P_{x,y+1}$ at the $t_3$ frame etc. For ease of the description, a difference between depth-of-field values of $P_{x,y}$ at the $t_1$ frame and $P_{x,y}$ at the $t_2$ frame is calculated as the temporary depth-of-field difference of $P_{x,y}$ by taking calculations of $P_{x,y}$ at the $t_1$ frame and $P_{x,y}$ at the $t_2$ frame as an example. In addition, although the average value is used above, the average value may not be calculated actually, and the depth-of-field differences of the pixels may be compared and/or calculated as described below as long as the same calculation method is used for each pixel.

After calculating the temporary depth-of-field differences of various pixels, a standard deviation of the temporary depth-of-field differences in the 3D image/video/partition may be calculated as follows:

$$S_2 = \sqrt{\frac{\sum_{j=1}^{n}(P_j - P_{ave2})^2}{n}}$$

as the temporary visual fatigue of the 3D image/video/partition, where $P_j$ is a temporary depth-of-field difference calculated for a $j^{th}$ pixel, $P_{ave2}$ is P an average value of the temporary depth-of-field differences, n is a number of pixels in the 3D image/video/partition, and $S_2$ is the temporary visual fatigue.

The purpose of the temporal visual fatigue is to present a visual fatigue caused by different time-dependent depth of fields of a pixel at the same location observed by an observer in two or more pictures which are temporally adjacent or spaced adjacent. For example, the visual fatigue is likely to occur when the observer observes that a certain object is switched back and forth between a distant location and a nearby location on the same pixel, and the temporal visual fatigue reflects this feature in the 3D video.

In addition, in a more common example, both of the spatial visual fatigue and the temporal visual fatigue are reflected at the same time when an object, for example, moves horizontally in a picture and exhibits a change in a depth of field (for example, when the object moves to a distant location across the picture). In this case, both of the two visual fatigue measures may be used to comprehensively consider the visual fatigue of the 3D video.

In addition, in consideration that a certain visual fatigue may also occur even when the user observes the same still picture (even if all the objects in the picture are at the same depth of field), it is also possible to introduce a concept of a standard visual fatigue. That is, in addition to the spatial visual fatigue and the temporal visual fatigue, a standard error (or a root mean square error) $S_3$ of differences between depth-of-field values of various pixels and a certain default depth-of-field value or an optimum observation depth-of-field value may be calculated in step S250. Thus, a default fatigue of the 3D image/video may be characterized by the standard visual fatigue.

After various visual fatigues have been calculated in steps S230, S240 and/or S250, the visual fatigues may be comprehensively considered in step S260 to determine a comprehensive visual fatigue. A more intuitive way is to calculate an average value of the visual fatigues. For example, a final visual fatigue may be determined using a formula $$S = \frac{S_1 + S_2}{2}$$

after calculating the temporary visual fatigue and the spatial visual fatigue. As another example, the final visual fatigue may be determined using the formula $$S = \frac{S_1 + S_2 + S_3}{3}$$

after calculating the standard visual fatigue, the temporal visual fatigue and the spatial visual fatigue. In addition, a weighting approach may be used to determine the final visual fatigue to reflect different characteristics of the 3D image/video. For example, if there are a large number of motion scenes in a certain 3D movie, a weight of the temporary visual fatigue may be correspondingly increased. As another example, if there are both a lot of distant objects to be observed and a lot of nearby objects to be observed in a certain 3D movie, a weight of the spatial visual fatigue may be correspondingly increased.

Next, if the 3D image/video is divided into a plurality of partitions in the optional step S210, an overall visual fatigue may be determined according to at least one partition for which visual fatigues are determined in an optional step S270. For example, the overall visual fatigue may be obtained by using different weights for different partitions as described above.

Thus, the method 200 for determining a visual fatigue of a 3D image or 3D video has been described in connection with FIGS. 2 to 5. With this method 200, a visual fatigue of a certain 3D image/video may be relatively objectively determined, to provide the user with a widely applicable standard, and the scheme is easy to implement and the calculation is simple. The embodiments of the present disclosure reflect the fatigue value of the 3D image or video by calculating depth-of-field differences at different locations and depth-of-field differences at the same location at different times, thereby solving the problem that the visual fatigue cannot be objectively detected.

Figure 6:
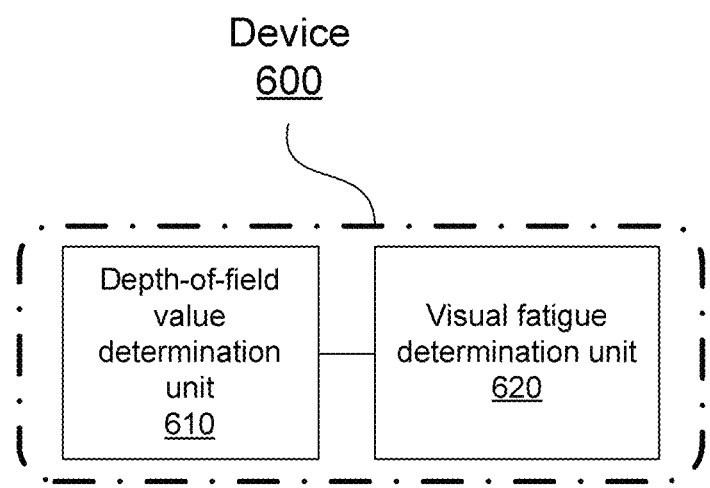
FIG. 6 is a block diagram illustrating an exemplary device for determining a visual fatigue of a 3D image or 3D video according to an embodiment of the present disclosure.

FIG. 6 is a block diagram illustrating an exemplary device 600 for determining a visual fatigue of a 3D image or video according to an embodiment of the present disclosure. As shown in FIG. 6, the device 600 may comprise a depth-of-field value determination unit 610 and a visual fatigue determination unit 620.

The depth-of-field value determination unit 610 may be used to determine depth-of-field values of at least a part of pixels of the 3D image or at least one frame of 3D image in the 3D video. The depth-of-field value determination unit 610 may be a Central Processing Unit (CPU), a Digital Signal Processor (DSP), a microprocessor, a microcontroller etc. of the device 600, and may cooperate with a communication portion (for example, a wireless transceiver, an Ethernet card, an xDSL modem etc.) and/or a storage portion (for example, a Random Access Memory (RAM), an SD card etc.) of the device 600 to acquire all or a part of data of the 3D image or video to be processed, and determine depth-of-field values of at least a part of pixels of the 3D image or video.

The visual fatigue determination unit 620 may be used to determine the visual fatigue of the 3D image or the 3D video according to the depth-of-field values. The visual fatigue determination unit 620 may also be a CPU, a DSP, a microprocessor, a microcontroller etc. of the device 600, and may acquire the depth-of-field values determined by the depth-of-field value determination unit 610, and determine the visual fatigue of the 3D image or the 3D video according to the depth-of-field values.

In addition, the device 600 may further comprise other functional units not shown in FIG. 6, such as a bus, a memory, a power supply, an antenna, a communication portion, and a storage portion. However, these units do not influence the understanding of the principle of the present application, and therefore the detailed description thereof is omitted here.

Figure 7:
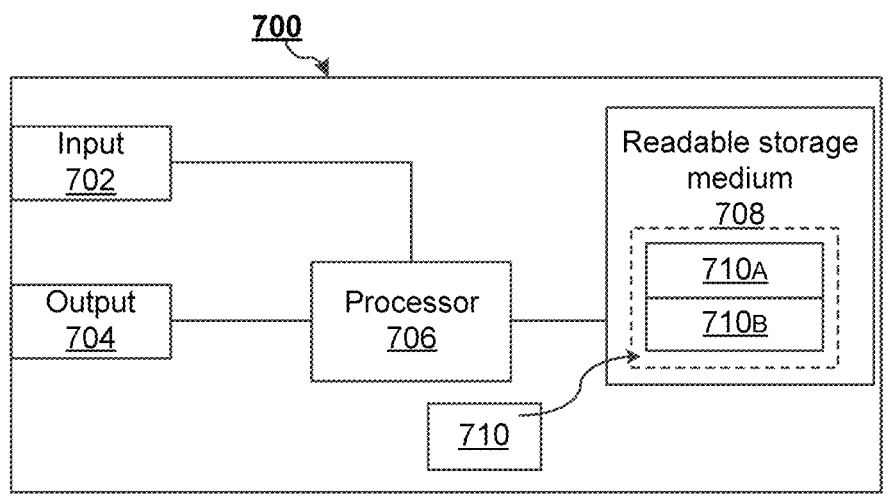
FIG. 7 is a diagram illustrating a hardware arrangement of the device shown in FIG. 6 according to an embodiment of the present disclosure.

FIG. 7 is a block diagram illustrating an exemplary hardware arrangement 700 of the device 600 shown in FIG. 6 according to an embodiment of the present disclosure. The hardware arrangement 700 may comprise a processor 706 (for example, a DSP, a CPU, etc.). The processor 706 may be a single processing unit or a plurality of processing units for performing different actions of the flow described herein. The arrangement 700 may also comprise an input unit 702 for receiving signals from other entities, and an output unit 704 for providing signals to other entities. The input unit 702 and the output unit 704 may be arranged as a single entity or separate entities.

In addition, the arrangement 700 may comprise at least one (non-transitory) readable storage medium 708 in a form of non-volatile or volatile memory, such as an Electrically Erasable Programmable Read-Only Memory (EEPROM), a flash memory, and/or a hard disk driver. The readable storage medium 708 comprises a computer program 710 which includes codes/computer readable instructions that, when executed by the processor 706 in the arrangement 700, enable the hardware arrangement 700 and/or the device 600 including the hardware arrangement 700 to perform, for example, flows described above in connection with FIG. 2 and any variations thereof.

The computer program 710 may be configured with computer program codes having, for example, architecture of computer program modules 710A-710B. Therefore, in an exemplary embodiment when the hardware arrangement 700 is used in the device 600, the codes in the computer program of the arrangement 700 comprise a module 710A for determining depth-of-field values of at least a part of pixels of the 3D image or at least one frame of 3D image in the 3D video. The codes in the computer program also comprise a module 710B for determining the visual fatigue of the 3D image or the 3D video according to the depth-of-field values.

The computer program modules may substantially perform the various actions in the flow shown in FIG. 2 to simulate the device 600. In other words, when different computer program modules are executed in the processor 706, they may correspond to the above different units in the device 600.

Although the code means in the embodiments disclosed above in conjunction with FIG. 7 are implemented as computer program modules that, when executed in the processor 706, cause the hardware arrangement 700 to perform the actions described above in connection with FIG. 2, in alternative embodiments, at least one of the code means may be implemented at least in part as a hardware circuit.

The processor may be a single CPU, but may also comprise two or more processing units. For example, the processor may comprise a general purpose microprocessor, an instruction set processor, and/or a related chipset and/or a dedicated microprocessor (for example, an Application Specific Integrated Circuit (ASIC)). The processor may also comprise an on-board memory for caching purposes. The computer program may be carried by a computer program product connected to the processor. The computer program product may comprise a computer-readable medium having stored thereon a computer program. For example, the computer program product may be a flash memory, a RAM, a Read Only Memory (ROM), and an EEPROM, and the computer program module may, in an alternative embodiment, be distributed to different computer program products in a form of memory within the UE.

The present disclosure has thus far been described in connection with some embodiments. It is to be understood that various other changes, substitutions and additions can be made by those skilled in the art without departing from the spirit and scope of the present disclosure. Accordingly, the scope of the present disclosure is not limited to the specific embodiments described above, but should be defined by the appended claims.

In addition, functions described herein as being implemented by only hardware, only software and/or firmware can also be implemented by means of dedicated hardware, a combination of general purpose hardware and software, etc. For example, functions described as being implemented by dedicated hardware (for example, a Field Programmable Gate Array (FPGA), an ASIC, etc.) can be implemented by general purpose hardware (for example, a CPU, a DSP) in combination with software, and vice versa.

The invention claimed is:

1. A method for determining a visual fatigue of a three dimensional (3D) image or a 3D video, the method comprising:
    determining depth-of-field values of at least a part of pixels of the 3D image or at least one frame of 3D image in the 3D video; and
    determining the visual fatigue of the 3D image or the 3D video according to the depth-of-field values:,
    wherein the step of determining the visual fatigue of the 3D image or the 3D video according to the depth-of-field values comprises:
        determining spatial depth-of-field differences between spatial adjacent pixels in the at least a part of the pixels according to the depth-of-field values;
        determining a spatial visual fatigue of the 3D image or the 3D video according to the spatial depth-of-field differences; and
        determining the visual fatigue at least partly according to the spatial visual fatigue.

2. The method according to claim 1, wherein determining depth-of-field values of at least a part of pixels of the 3D image or at least one frame of 3D image in the 3D video comprises:
    determining a parallax of each of the at least a part of the pixels; and
    determining a depth-of-field value of a corresponding pixel according to the parallax.

3. The method according to claim 1, wherein the spatial adjacent pixels comprise one or more adjacent or spaced adjacent pixels in a spatial direction.

4. The method according to claim 1, wherein the step of determining a spatial visual fatigue of the 3D image or the 3D video according to the spatial depth-of-field differences comprises:
   determining a standard deviation of all the spatial depth-of-field differences as the spatial visual fatigue of the 3D image or the 3D video.

5. The method according to claim 1, wherein the step of determining the visual fatigue of the 3D video according to the depth-of-field values comprises:
   calculating temporal depth-of-field differences between corresponding pixels in two frames of 3D image in the 3D video;
   determining a temporal visual fatigue of the 3D video according to the temporal depth-of-field differences; and
   determining the visual fatigue at least partly according to the temporal visual fatigue.

6. The method according to claim 5, wherein the two frames of 3D image are two frames of 3D image which are adjacent or spaced adjacent to each other in a forward time direction and/or in a backward time direction.

7. The method according to claim 5, wherein the step of determining a temporal visual fatigue of the 3D video according to the temporal depth-of-field differences comprises:
   determining a standard deviation of all the temporal depth-of-field differences as the temporal visual fatigue of the 3D video.

8. The method according to claim 1, wherein the step of determining the visual fatigue of the 3D image or the 3D video according to the depth-of-field values comprises:
   calculating, for the at least a part of the pixels, a standard error between the depth-of-field values of the at least a part of the pixels and predetermined depth-of-field values, as a standard visual fatigue; and
   determining the visual fatigue at least partly according to the standard visual fatigue.

9. The method according to claim 1, wherein the step of determining the visual fatigue of the 3D image or the 3D video according to the depth-of-field values comprises:
   determining the visual fatigue according to any two or more of a spatial visual fatigue, a temporal visual fatigue, and a standard visual fatigue.

10. The method according to claim 1, wherein before determining depth-of-field values of at least a part of pixels of the 3D image or at least one frame of 3D image in the 3D video, the method further comprises dividing the 3D image or at least one frame of 3D image in the 3D video into multiple partitions,
    wherein the step of determining depth-of-field values of at least a part of pixels of the 3D image or at least one frame of 3D image in the 3D video and the step of determining the visual fatigue of the 3D image or the 3D video according to the depth-of-field values are performed for at least one of the multiple partitions, to determine visual fatigues of corresponding partitions respectively; and
    determining the visual fatigue of the 3D image or at least one frame of 3D image in the 3D video according to the visual fatigues of the at least one partition.

11. The method according to claim 10, wherein the step of determining the visual fatigue of the 3D image or at least one frame of 3D image in the 3D video according to the visual fatigues of the at least one partition comprises:
    determining a weight of a corresponding partition according to a size and/or location of each of the at least one partition; and
    determining the visual fatigue of the 3D image or at least one frame of 3D image in the 3D video according to visual fatigues of respective partitions and corresponding weights of the partitions.

12. A device for determining a visual fatigue of a three dimensional (3D) image or a 3D video, comprising:
    a processor,
    a memory having instructions stored thereon, which, when executed by the processor, cause the processor to:
        determine depth-of-field values of at least a part of pixels of the 3D image or at least one frame of 3D image in the 3D video; and
        determine the visual fatigue of the 3D image or the 3D video according to the depth-of-field values;
    wherein the instructions, when executed by the processor, further cause the processor to:
        determine spatial depth-of-field differences between spatial adjacent pixels in the at least a part of the pixels according to the depth-of-field values;
        determine a spatial visual fatigue of the 3D image or the 3D video according to the spatial depth-of-field differences; and
        determine the visual fatigue at least partly according to the spatial visual fatigue.

13. The device according to claim 12, wherein the instructions, when executed by the processor, further cause the processor to:
    determine a parallax of each of the at least a part of the pixels; and
    determine a depth-of-field value of a corresponding pixel according to the parallax.

14. The device according to claim 12, wherein the instructions, when executed by the processor, further cause the processor to:
    calculate temporal depth-of-field differences between corresponding pixels in two frames of 3D image in the 3D video;
    determine a temporal visual fatigue of the 3D video according to the temporal depth-of-field differences; and
    determine the visual fatigue at least partly according to the temporal visual fatigue.

15. The device according to claim 12, wherein the instructions, when executed by the processor, further cause the processor to:
    calculate, for the at least a part of the pixels, a standard error between the depth-of-field values of the at least a part of the pixels and predetermined depth-of-field values, as a standard visual fatigue; and
    determine the visual fatigue at least partly according to the standard visual fatigue.

16. The device according to claim 12, wherein the instructions, when executed by the processor, further cause the processor to:
    determine the visual fatigue according to the spatial visual fatigue and one or more of a temporal visual fatigue and a standard visual fatigue.

17. The device according to claim 12, wherein the instructions, when executed by the processor, further cause the processor to:
    determine depth-of-field values of at least a part of pixels for at least one of the multiple partitions, and determine visual fatigues of corresponding partitions according to the depth-of-field values; and determine the visual fatigue of the 3D image or at least one frame of 3D image in the 3D video according to the visual fatigues of the at least one partition.

18. A non-transitory computer readable storage medium for storing a computer program, which, when executed by a processor, causes the processor to perform the method according to claim 1.

* * * * *